United States Patent
Fertig

[19]

[11] Patent Number: 6,050,493
[45] Date of Patent: Apr. 18, 2000

[54] PRE-PAID FLOWER OR GIFT CARD

[75] Inventor: Aaron Fertig, Lawrence, N.Y.

[73] Assignee: American Floral Company, LLC, New York, N.Y.

[21] Appl. No.: 08/980,897

[22] Filed: Dec. 1, 1997

[51] Int. Cl.[7] .................................................. G06K 19/00
[52] U.S. Cl. ............................................. 235/487; 283/56
[58] Field of Search .................................. 235/487, 375, 235/380, 381, 435, 462.01; 705/26; 283/51, 56, 903

[56] References Cited

U.S. PATENT DOCUMENTS

| | | | |
|---|---|---|---|
| 3,686,630 | 8/1972 | Zubay | 235/441 |
| 4,638,312 | 1/1987 | Quinn et al. | 235/383 X |
| 4,725,719 | 2/1988 | Oncken et al. | 235/381 |
| 4,808,805 | 2/1989 | Harbers | 235/490 |
| 5,228,723 | 7/1993 | Hertig | 283/56 X |
| 5,406,068 | 4/1995 | Nusbaum | 235/493 |
| 5,440,479 | 8/1995 | Hutton | 364/401 |
| 5,442,567 | 8/1995 | Small | 235/381 X |
| 5,449,179 | 9/1995 | Hefferan | 273/269 |
| 5,504,321 | 4/1996 | Sheldon | 235/492 |
| 5,513,117 | 4/1996 | Small | 235/381 X |
| 5,640,447 | 6/1997 | Fonseca | 379/144 |
| 5,765,141 | 6/1998 | Spector | 395/201 |
| 5,890,741 | 4/1999 | Hollander | 283/62 |
| 5,905,973 | 5/1999 | Yonezawa et al. | 705/26 |

*Primary Examiner*—Donald Hajec
*Assistant Examiner*—Diane I. Lee
*Attorney, Agent, or Firm*—Gottlieb, Rackman & Reisman, P.C.

[57] ABSTRACT

A pre-paid card for sending a gift such as flowers is sized to fit inside a wallet, having a front face with photographs or drawings with a plurality of pre-selected gift items and back face with warranty and instructional information, as well as a telephone access number and a PIN number which is unique to the card. A plurality of pre-selected items depicted on the front face of the card will each have a corresponding identifier number or code, so that the card user can easily select a gift item to be ordered.

11 Claims, 2 Drawing Sheets

PRE-PAID FLOWER OR GIFT CARD

BACKGROUND OF THE INVENTION

This invention relates to a card product, and more particularly, to a pre-paid card for ordering flowers or some other type of gift item.

Pre-paid cards for telephone calls are well known. Typically, a consumer purchases a pre-paid calling card that is operable by dialing an 800 access number and a corresponding PIN number that is unique to the particular calling card that is purchased. After dialing the 800 number and the unique corresponding PIN number, when prompted by the service company, a consumer can make a domestic or international long distance telephone call.

Pre-paid telephone calling cards are typically purchased by individuals without easy access to credit. These include business travelers, students, and any other individual who is away from home on a regular basis.

While the prior art enables travelers and students to utilize the card-based system for making telephone calls, there is no card-based system for enabling those individuals to order gifts or other occasion items. For example, when away from home on a holiday such as Mother's Day, Christmas or a birthday, a traveler or a student should be able to easily order flowers or some other type of gift without having to purchase the item and send it, or order the item without having seen what it is. It is these disadvantages which the present invention overcomes.

SUMMARY OF THE INVENTION

Generally speaking, in accordance with the invention, a pre-paid card for sending a gift such as flowers is described. The pre-paid card is sized to fit inside a wallet, and has a front face with photographs or drawings of a plurality of pre-selected gift items, and back face with warranty and instructional information, as well as a telephone access number and a PIN number which is unique to the card. A plurality of pre-selected items depicted on the front face of the card will each have a corresponding identifier number or code, so that the card user can easily select a gift item to be ordered.

Accordingly, it is an object of the invention to provide an improved pre-paid card.

Yet another object of the invention is to provide a pre-paid card for sending flowers and other gift items.

Yet a further object of the invention is to provide a pre-paid gift card which is imprinted with instructional and warranty information on one side, and consumer ordering information on the other side.

Still other objects and advantages of the invention will in part be obvious and will in part be apparent from the following description.

The invention accordingly comprises the several steps and the relation of one or more such steps with respect to each of the others, and the article of manufacture possessing the features, properties and relation of elements which will be exemplified in the article hereinafter described, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENT

Figure 1:
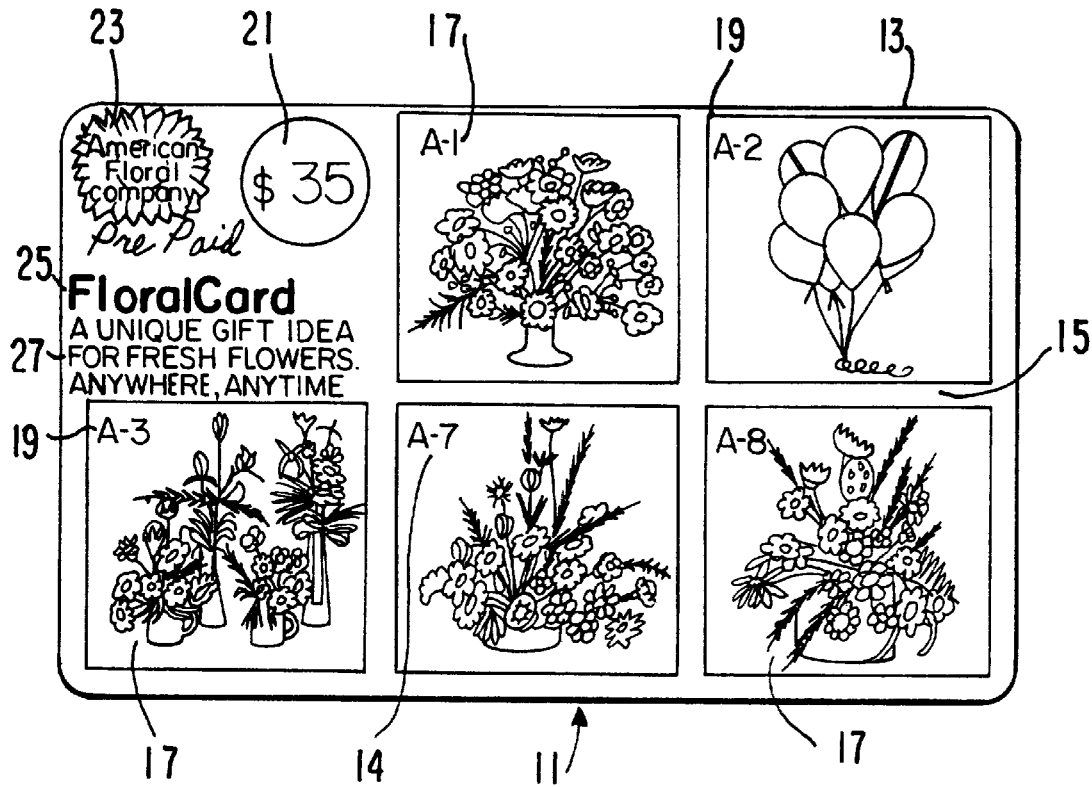
FIG. 1 is a front elevational view of a pre-paid gift card made in accordance with the invention.
Figure 2:
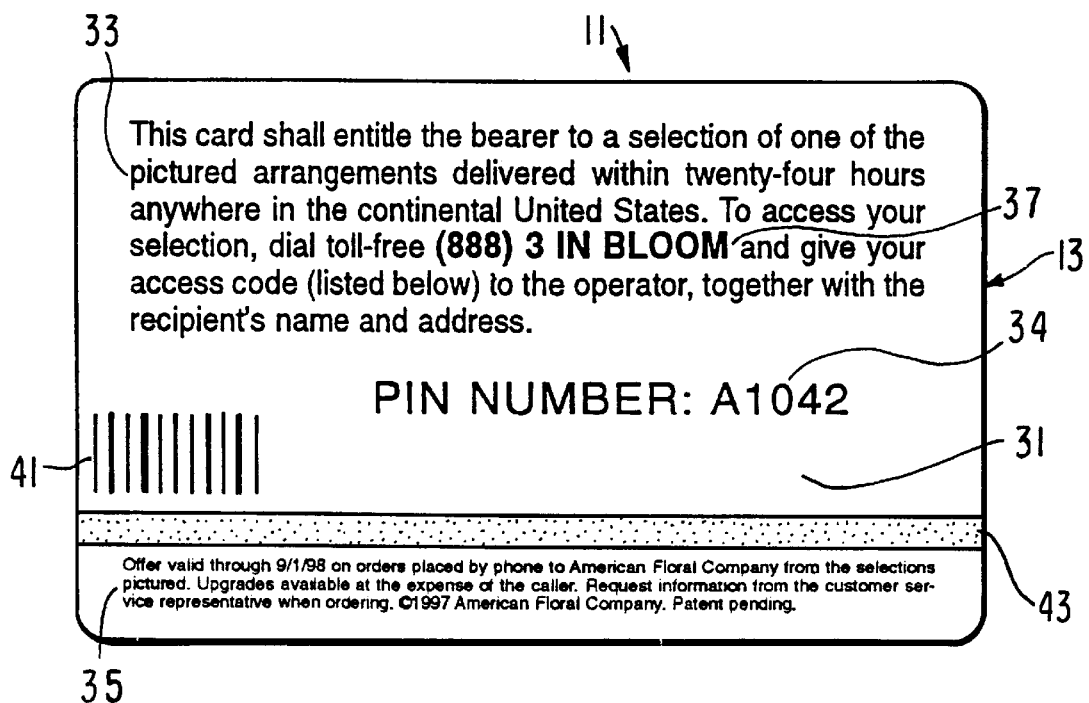
FIG. 2 is a rear elevational view of the card depicted in FIG. 2.

As shown in FIGS. 1 and 2, a pre-paid gift card generally indicated at 11, and made from a paper, paper equivalent or cardboard material, plastic, or other printable substrate, is shown. Card 11 is made from a single rectangular panel 13 that is sized for fitting into a conventional credit card receptacle contained in a wallet or purse. Panel 13 comprises a front face 15 (see FIG. 1) and a back or rear face 31 (see FIG. 2).

As shown in FIG. 2, back face 31 includes printed instruction information 33, which identifies an access telephone number. Back face 31 also identifies a PIN number 39 that is unique to card 11. PIN number 39, however, is optionally not effective or activated until magnetic stripe 43 is processed through a read-out unit. Stripe 43 would allow card 11 to be activated at the point of sale, and may be also used to imprint other various electronic information pertaining to the sales, marketing and inventory processes. As a result, card 11 may be displayed in an open showroom or stock area for customer self-selection.

Continuing with FIG. 2, back face 33 further includes written warranty information 43 printed thereon, which is required under most applicable state laws. Back face 31 further includes either a UPC or ASCII code 41 for recording store inventory and/or tracking vendor sales, as is well known in the art.

Turning once again to FIG. 1, front face 15 of panel 13 includes price information 21 so that the consumer knows the cost or purchase fee of card unit 11. Face 15 of panel 13 also includes description 25 which identifies what the product is; source information 23 which identifies the manufacturer or sponsor of gift card unit 11; and perhaps some type of promotional printed information 27.

Significantly, front face 15 includes illustrations 17 of a plurality of pre-selected gift items. In the specific embodiment described, the gift items illustrated are various types of floral arrangements. However, the invention is not limited to ordering a flower gift item, and any other type of gift or occasion item may be illustrated on front face 15 of card unit 11, as is desired. Such items can include candy, fruit baskets, and various types of novelty items. The inventive gift card item 11 is suitable for sending a gift for any type of occasion such as a baby shower, birthdays, anniversaries, Valentine's Day, Mother's or Father's Day, etc.

As can be appreciated from FIG. 1, each illustration 17 of a pre-selected gift item has a corresponding identifier 19 printed adjacent thereto. Identifier 19 is used for telephone ordering the corresponding gift item, as will be described below.

The use of inventive gift card item 11 is now described. When a consumer goes into a retail store, he or she brings card unit 11 to the sales cashier, who passes back face 31, carrying magnetic stripe 43, through a read-out device, which automatically activates the card. As can be appreciated, instructional information 33 printed on back face 31 identifies telephone access number 37 and PIN number 39, unique to card unit 11. The PIN number, however, is optionally not effective or activated until magnetic stripe 43 is processed through the read-out unit, as previously described. Optionally, the PIN number may be concealed on face 31 by means of a scratch-off element, as is well known.

Following purchase, the consumer is free, at his or her discretion, to access a selection by dialing telephone access number 37. The consumer will identify a gift item to be selected by identifying a corresponding identifier 19 to the operator who answers the telephone call. During the telephone call, the consumer will also have to provide the name and address information pertaining to where the gift item is to be sent. The cost for sending the gift item is designated by price information.

Depending on the service provided, the consumer will either provide the access PIN number when speaking to the operator at the time of placing his or her order, or by punching in the PIN number when dialing the toll-free access number.

Alternatively, price information 31 may identify the price suitable for several different orders of gift items, depending upon whether the service provides for a throw-away card based on a single use, or instead enables multiple uses of the card.

Illustrations 17 of the plurality of gift items can either be photos, drawings or some other mechanism for accurately and clearly illustrating to the consumer the possible items to be selected.

In summary, there is provided a one-piece card unit for ordering gifts imprinted with instructional operating information, indicia for activating the card, and a series of illustrations for identifying to the consumer a plurality of pre-selected gift items.

It will thus be seen that the objects set forth above, among those made apparent from the preceding description, are efficiently attained, and since certain changes may be made in producing the above construction without departing from the spirit and scope of the invention, it is intended that all matter contained in the above description and shown in the drawings shall be interpreted as illustrative and in a limiting sense.

It is further understood that the following claims are intended to cover all of the features of the invention therein described, and all statements of the scope of the inventive, which, as a matter of language, might be said to fall therebetween.

I claim:

1. A pre-paid card for ordering a gift item comprising a panel sized to be received in a conventional wallet or purse card compartment, and having front and rear faces, said front face including illustrations of a plurality of pre-selected gift items with each said illustration having a corresponding identifier printed adjacent thereto, wherein one of said front and rear faces being imprinted with instructional information for ordering any one of said gift items by designating said corresponding identifier.

2. The pre-paid card of claim 1, wherein one of said front and rear faces is imprinted or fixed with read-out indicia for activating said card at or following purchase.

3. The pre-paid card of claim 2, wherein said read-out indicia is selected from the group consisting of a magnetic stripe, UPC code, and a ASCII code.

4. The pre-paid card of claim 1, wherein at least a portion of one of said front and back faces is imprinted with informational material relating to the purchase and sale of said card.

5. The pre-paid card of claim 1, wherein one of said faces of said panel is imprinted with warranty information.

6. The pre-paid card of claim 1, wherein said plurality of pre-selected gift items comprise a plurality of different floral arrangements.

7. The pre-paid card of claim 1, wherein said illustrations of a plurality of pre-selected gift items comprise photographs of said gift items.

8. The pre-paid card of claim 1, wherein one of said front and rear faces includes price information imprinted thereon.

9. The pre-paid card of claim 8, wherein said price information reflects a price for ordering only one of said illustrated plurality of pre-selected gift items.

10. The pre-paid card of claim 1, wherein one of said front and rear faces identifies a PIN number unique to said card.

11. The pre-paid card of claim 1, wherein said instructional information includes a telephone number to be used in ordering any one of said gift items.

\* \* \* \* \*